Patented Jan. 17, 1933

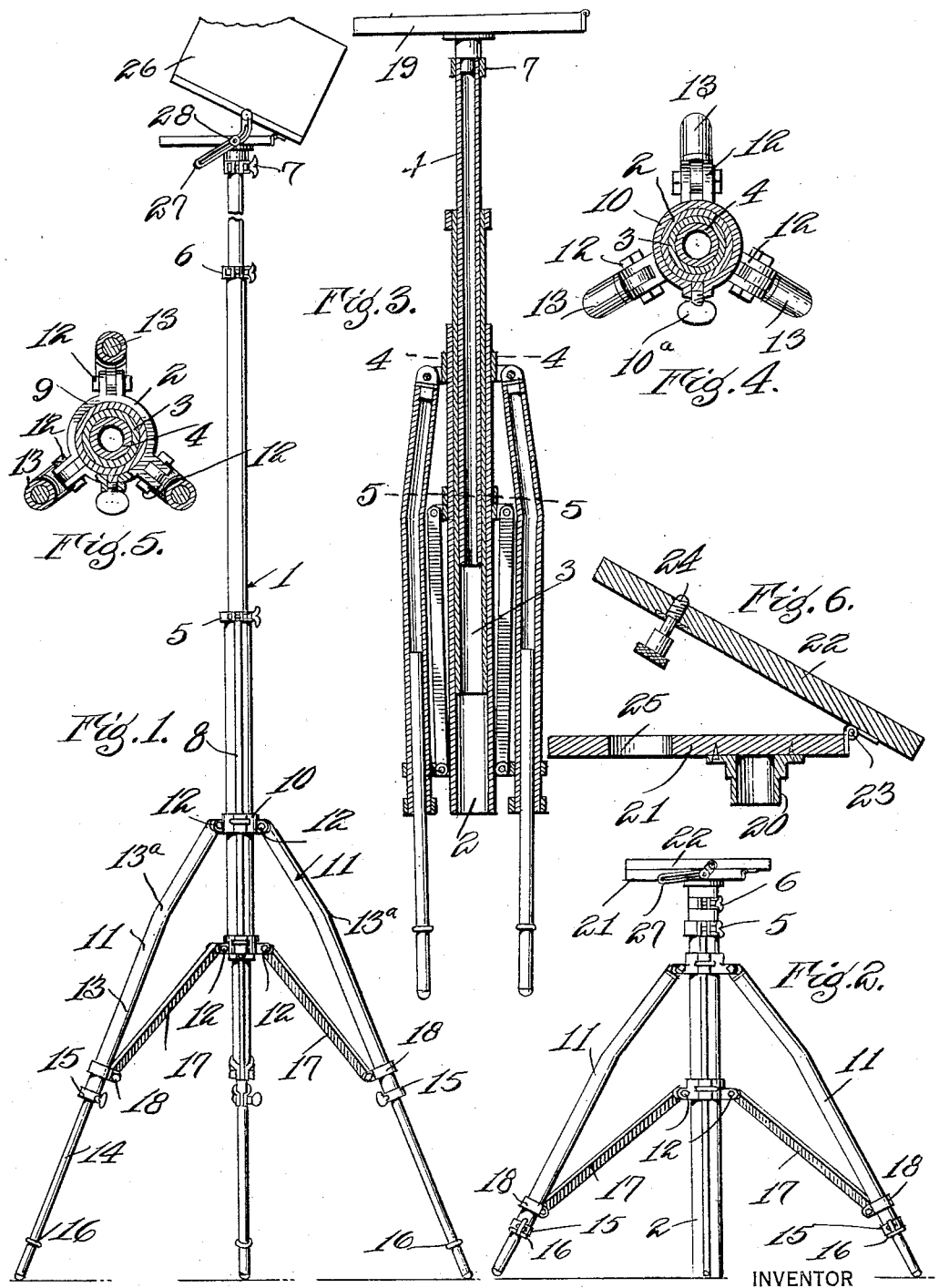

1,894,695

UNITED STATES PATENT OFFICE

GEORGE ALBERT LEY, OF CHICAGO, ILLINOIS

TRIPOD

Application filed August 15, 1930. Serial No. 475,497.

My invention relates to supports used to support surveying instruments, photographic cameras, and the like, more particularly to a supporting tripod for use in photography requiring the camera to be positioned at a low level as in the photographing of children and the like, and it consists in the combinations, constructions and arrangements herein shown and described.

Heretofore, photographers have experienced great difficulty in photographing children and objects positioned close to the ground, because there was no camera support such as a tripod that was adapted to position the camera close to the ground or other support, and yet provide adequate support for the camera. It is therefore a primary purpose of my invention to provide a support of the type described that is adapted to support a camera at a short distance above the ground as well as at variable points above said short distance as desired by the operator.

A further object of my invention is to provide a tripod in which the central supporting staff is protected against mutilation from the set screws engageable therewith.

A still further object of my invention is to provide a support of the type described in which the supporting platform is adapted to position the camera or other object at varying angles to the horizontal, while at the same time maintaining the center of gravity of the same in a position near to the central staff, to obviate liability of the tripod to tipping or canting because of unequal distribution of the parts about the point of support.

A yet further object of my invention is to provide a device of the type described, which has few parts, does not get out of order easily and is simple to manufacture.

Other objects and advantages will appear as the specification proceeds and the invention will be more particularly defined in the appended claims.

My invention is illustrated in the accompanying drawing forming a part of this application, in which:—

Figure 1 is an elevational view of my invention,

Figure 2 is a similar view with the device in another operative position,

Figure 3 is a sectional view with parts of the device shown in elevation for clearness of illustration, Figure 4 is a sectional view on line 4—4 of Figure 3, Figure 5 is a sectional view on line 5—5 of Figure 3, and Figure 6 is a sectional detail view of a portion of the device.

In carrying out my invention I make use of a telescoping staff designated by numeral 1, which constitutes the central supporting staff of my device. This staff is composed of three telescoping sections, 2, 3 and 4, which may be of tubular structure as shown or made in any other suitable manner.

Each of the sections is provided with a clamping collar, 5, 6 and 7, respectively, 5 and 6 of which clamping collars secure said sections in any desired relative positions, while clamping collar 7 secures the platform in place as appears clearly in Figure 3. These collars may be of conventional construction such as the bands of metal shown with screws and associated wing nuts for compressing the same.

The lower section 2 of the staff 1 is provided with a longitudinally extending strip 8 preferably of rectilinear formation. The strip co-operates with the legs and associated parts of my tripod to achieve functions later to be described.

For mounting the legs on section 2, the same is equipped with a pair of crow feet 9 and 10, which consist of metal bands or collars having a portion formed to snugly engage the strip 8, and pairs of ears forming clevises for swivelly mounting the legs. Each of the crow feet is further equipped with a set screw 10a engageable through the portion opposite strip 8 with said strip, which enables an operator to position the same along the tube as desired, and without mutilation thereof.

The three legs 11 of the tripod are pivoted to the clevises of crow foot 10, as is indicated at 12. These legs are also of telescoping formation consisting of sections 13 and 14. Sections 13 are equipped with clamping collars 15 of construction similar to collars 5, 6 and 7, or of any other conventional construction. In this construction I show the same as comprising a mere enlarged boss on section 13, with a set screw engageable therethrough and with section 14. This permits an operator to lengthen or shorten the legs as desired. The lower sections 14 are equipped with stops 16, which limit overtravel of said sections into sections 13.

It will be noted that sections 11 are bent as indicated at 13a. This formation comprises a very important part of my invention as it permits pivoting of the legs at a high point on section 2, without interfering with the bringing of said legs into compact formation when the device is not in use, or is in use under particular circumstances requiring close positioning of the legs.

The legs 11 are adjustably secured in position by means of braces 17, which extend between said legs at point 18 on sections 13 thereof, and the clevises of crow foot 9, where they are swivelly mounted.

For mounting the camera or other object I equip the staff 1 with a platform 19 constructed in accordance with my invention. This platform is provided with a stud 20, which projects into section 4 for engagement by clamping collar 7 for securing the same in position. The platform consists of a pair of members 21 and 22 hingedly related as indicated at 23. It will be noted that member 21 is shorter than 22 and that hinge 23 is placed very close to member 20, at which point the platform is supported. A screw 24 is provided in member 22 for engagement with the base of a camera for securing the same in position on member 22, while member 21 is apertured as indicated at 25 to accomodate the screw.

The member 22 on which the camera 26 is mounted is guided from one angular position to another and secured in any desired angular relation to the member 21 by means of the slotted guides 27 pivoted to member 22 and the cooperating set screw mounted on member 21.

From the foregoing description the use and operation of my device is easily understood. When the operator desires to take pictures of persons of adult size he positions the tripod as shown in Figure 1, making the various adjustments as above outlined.

When he desires to take a picture of a child or object close to the floor he places the tripod in the position shown in Figure 2. He is able to secure a lower position with a tripod of this nature than a tripod of ordinary construction as the legs in this device can be slid upwardly on the staff 2 a considerable distance, that is, to the point where the staff 1 engages the ground, and still be braced by braces 17, and adapted for compact arrangement as shown in Figure 3, when not in use.

When the operator desires to pack the equipment he simply telescopes the legs and staff to the greatest inward extent and places the leg sections 13 and associated braces 17 in close proximity to one another and the staff, that is, in the position shown in Figure 3.

The camera 26, of course can be placed at any angle desired when the tripod is placed in any of its operative positions by merely loosening the set screws 28, and raising or lowering the element 22 and camera, and then tightening said screws. There will be no tendency of the tripod to upset when the camera is on it as the same is supported at all times at a point practically under its center of gravity.

It is thus seen that I have provided a support for a camera or the like which is easily adapted to support said camera at very low levels or higher levels, while at the same time allowing the parts to be folded into compact formation for packing.

It is also seen that I have provided a tripod in which the central staff is not liable to mutilation by set screws or other means engaging therewith as in tripod staffs of ordinary construction.

It can also be seen that I have provided a tripod, whose supporting platform is adapted to support an object such as a camera in a plurality of angular positions without tending to cause tipping of said tripod due to a loss of equilibrium.

I claim:—

1. A support for cameras and the like comprising a staff for supporting the camera, a longitudinally extending strip positioned on said staff, collars mounted on said staff for snug engagement therewith and with said strip, legs swivelly related to one of said collars, leg braces swivelly related to the other of said collars and to said legs, and set screws engageable through said collars and with said strip for securing said legs in adjusted position.

2. A support for cameras and the like comprising a staff for supporting the camera, legs and associated braces having collars swivelled thereto for sliding engagement with said staff, set screws engageable through said collars, and a strip positioned on said staff for engagement by said set screws to prevent mutilation of said staff.

GEORGE ALBERT LEY.